United States Patent

Williams et al.

[11] Patent Number: 5,579,418
[45] Date of Patent: Nov. 26, 1996

[54] IMAGE INTERPOLATION APPARATUS

[75] Inventors: Leon C. Williams, Walworth; Terri A. Clingerman, Palmyra, both of N.Y.

[73] Assignee: Xerox Corporation, Stamford, Conn.

[21] Appl. No.: 355,443

[22] Filed: Dec. 12, 1994

Related U.S. Application Data

[63] Continuation of Ser. No. 131,164, Oct. 4, 1993, abandoned.
[51] Int. Cl.$^6$ .................................................. G06K 9/42
[52] U.S. Cl. ..................... 382/300; 382/296; 358/451; 358/525; 348/581; 348/583
[58] Field of Search ................................. 358/451, 448, 358/525; 382/293, 296, 297, 298, 299, 300; 348/581, 583

[56] References Cited

U.S. PATENT DOCUMENTS

| | | | |
|---|---|---|---|
| 4,275,450 | 6/1981 | Potter | 364/515 |
| 4,587,621 | 5/1986 | DuVall | 364/577 |
| 4,682,290 | 7/1987 | Tan et al. | 364/413.18 |
| 4,742,553 | 5/1988 | Irwin | 382/47 |
| 4,809,083 | 2/1989 | Nagano et al. | 358/287 |
| 4,850,028 | 7/1989 | Kawamura et al. | 382/47 |
| 4,918,542 | 4/1990 | Nagashima et al. | 358/451 |
| 5,008,752 | 4/1991 | Van Nostrand | 358/160 |
| 5,025,405 | 6/1991 | Swanson | 364/723 |
| 5,048,102 | 9/1991 | Tararine et al. | 382/47 |
| 5,125,043 | 6/1992 | Karlsson | 382/47 |
| 5,187,753 | 2/1993 | Bloomberg | 382/46 |
| 5,200,598 | 4/1993 | Rencontre | 382/46 |
| 5,237,432 | 8/1993 | Calarco et al. | 358/451 |

FOREIGN PATENT DOCUMENTS

| | | | |
|---|---|---|---|
| 0367418 | 5/1990 | European Pat. Off. | G06F 15/62 |
| WO91/01527 | 2/1991 | WIPO | G06F 15/353 |

OTHER PUBLICATIONS

Patent Abstracts of Japan, "Device and System for Image Processing"; vol. 17; No. 210; (P-1526) Apr. 23, 1993; JP-A-04 349 496; Fujitsu Ltd; Dec. 3, 1992.

Ralston et al., Encyclopedia of Computer Science and Engineering, 1421–1422, 1983.

*Primary Examiner*—Leo Boudreau
*Assistant Examiner*—D. Richard Anderson, Jr.
*Attorney, Agent, or Firm*—Mark Costello

[57] ABSTRACT

Method and apparatus for providing interpolated image data from original image data represented in terms of pixels, each pixel defined in terms of value and position in an original image, includes an original image input receiving original image data from an original image source; a page memory operatively connected to the input for storing a page of original image received; a source of interpolation parameters indicating: a slow scan initial pixel value Xinit, a fast scan initial pixel value Yinit, a fast scan x offset value FSx, a fast scan y offset value FSy, a slow scan x offset value SSx, and a slow scan y offset value SSy; a bilinear sequencer calculating for each new pixel, from the received parameters a reference pixel within the image, and a pair of interpolation coefficients for interpolating new pixel values; a memory controller retrieving to an interpolation calculator from the page memory a set of original image pixels including the pixel at the reference position, and three other pixels whose position is a predetermined function of the position of the reference position pixel for each new pixel; and an interpolation calculator calculating a new pixel value as a function of the set of original pixels directed to it by the bilinear sequencer.

12 Claims, 6 Drawing Sheets

IMAGE INTERPOLATION APPARATUS

This is a continuation of application Ser. No. 08/131,164, filed Oct. 4, 1993, now abandoned.

This invention relates generally to a digital signal processing apparatus, and more particularly to a method and apparatus for deriving interpolated pixel values and locations in association with scaling or rotation of an image.

BACKGROUND OF THE INVENTION

In digital image processing, there is a distinct advantage to being able to electronically magnify, reduce or rotate the digital data coincident with the actual scanning of the document. Generally, the advantage is manifest in the ability to run the video capture and processing hardware at a predetermined video rate up to the image scaling circuitry and thereafter increasing or decreasing the video rate. Hence, the hardware may be designed for a specific operating speed, without having to continuously respond to changes in signal timing or frequency. A primary requirement in such operations is to provide interpolated pixel values and locations, that will accurately reflect the image in new data.

Two of the techniques which have been proposed for image scaling include nearest-neighbor and linear interpolation. Techniques of this type have applicability across a wide range of scanning products, for example the Xerox® 7650 Pro Imager® and electronic reprographic systems such as the Xerox® DocuTech Production Publisher®. The following disclosures may be relevant with regard to some of the approaches used for digital image scaling:

U.S. Pat. No. 4,275,450 to Potter discloses a magnification/demagnification apparatus and method wherein an accumulator is used to accumulate a reduction ratio, which, when greater than a predefined threshold, signals that the image signal should be passed on. Otherwise, the image signal is deleted and an additive reset count is added to the accumulator. In an alternative embodiment, an add-one circuit generates a signal which temporarily increases a magnification counter setting by one. The add-one circuit is only activated at selected times when the value in the magnification counter exceeds a threshold value.

U.S. Pat. No. 4,587,621 to DuVall discloses a device for magnification of image signals wherein a linear interpolator is used to calculate magnification ratios. The interpolator determines a spatial relationship of output values, with respect to a pair of digital scan values, where the spacing between successive scan outputs is defined as the reciprocal of a magnification value. A hardware circuit, which accumulates a magnification value and subsequently interpolates an input image to determine if an output pixel is valid, is used. Furthermore, the accumulated value is also used as an input to a large look-up table to determine the interpolated output value.

U.S. Pat. No. 4,742,553 to Irwin discloses a resolution conversion system for bitmap images using error term averaging, wherein an error value is added to an input value to generate an output value and a test value. An algorithm is disclosed which implements the resolution conversion and is particularly suitable for greyscale processing.

U.S. Pat. No. 4,809,083 to Nagano et al. discloses an image recording/reading apparatus with enlarging and reducing functions, wherein a desired magnification is divided into an integer part and a decimal part. The decimal part is then used to correct an image output. Every time the accumulated decimal part is greater than one, an output pixel is deleted.

U.S. Pat. No. 4,918,542 to Nagashima et al. discloses an image processing apparatus capable of smooth multi-area variable magnification, wherein an error term is determined by comparing a desired image magnification ratio with an actual image magnification ratio. Two counters are initially set to zero and count a number of output pixels and a number of input pixels. A signal, RDEB, stores an error term which is used to pad image output data. An algorithm is shown in FIGS. 10A, 10B, 11A, and 11B which pads an input image. The algorithm also determines if an output pixel is valid.

U.S. Pat. No. 5,008,752 to Van Nostrand discloses an interpolator for enlarging or reducing a digital image in two dimensions, which includes row and column interpolators. Both interpolators operate so as to generate signals indicating when the next element, row, or pixel is to be retrieved. The interpolators also produce a displacement address which is used to retrieve an interpolation coefficient from a look-up table, the interpolation coefficient being used subsequently to produce the interpolated output.

U.S. Pat. No. 5,025,405 to Swanson discloses a subsystem capable of image synthesis in a computer workstation. In general, the images to be displayed are represented by a function, wherein the values across an area, i.e., color or intensity, must be interpolated to accurately reflect the image. The system employs interpolation, based on precomputed integer and fractional portions of the function's slope, to scale the function using integer arithmetic U.S. Pat. No. 5,237,432 to Calarco et al. shows interpolation in one dimension.

WO-91/01527 by Newman discloses an interpolation system that generates an interpolated value in response to an input value. The system includes a function value store, an address generator, and an interpolator. In operation, the address generator is used to generate address signals to identify locations in the function value store, which in turn provides function values that are used in conjunction with the input value to generate the interpolated value.

The cited references are incorporated by reference for their teachings.

SUMMARY OF THE INVENTION

In accordance with the invention, there is provided a method and apparatus for accomplishing bilinear interpolation of pixel values, for the two dimensional determination of pixel locations and values in image processing functions such as scaling and rotation.

In accordance with one aspect of the invention, there is provided an arrangement for accomplishing bilinear interpolation, i.e., calculation of a pixel position and value as a function of the four surrounding original pixels.

In accordance with one aspect of the invention, apparatus generated interpolated image data from original image data represented in terms of pixels, each pixel defined in terms of value and position in an original image, includes an original image input receiving original image data from an original image source; a page memory operatively connected to the input for storing a page of original image received; a source of interpolation parameters indicating: a slow scan initial pixel value Xinit, a fast scan initial pixel value Yinit, a fast scan x offset value FSx, a fast scan y offset value FSy, a slow scan x offset value SSx, and a slow scan y offset value SSy; a bilinear sequencer calculating for each new pixel, from the received parameters a reference pixel within the image, and a pair of interpolation coefficients for interpolating new pixel values; a memory controller retrieving to an interpolation calculator from the page memory a set of original image pixels including the pixel at the reference position, and three other pixels whose position is a predetermined function of the position of the reference position pixel for each new pixel; and an interpolation calculator calculating a new pixel value as a function of the set of original pixels directed to it by the bilinear sequencer.

In accordance with another aspect of the invention there is provided apparatus for providing interpolated image data from original image data represented in terms of pixels, each pixel defined in terms of value and position in an original image, comprising:

an input control having as inputs from an external image source: image data, page synch signals, and line synch signals;

a memory controller, operative to direct image data to and from the input control to a page buffer memory;

an external control interface, receiving from an external control source values indicating interpolation requirements including: a slow scan initial pixel value Xinit, a fast scan initial pixel value Yinit, a fast scan x offset value FSx, a fast scan y offset value FSy, a slow scan x offset value SSx, and a slow scan y offset value SSy;

a bilinear sequencer receiving as inputs from the control interface the interpolation requirement values, calculating therefrom a reference pixel within the original image data, and a pair of interpolation coefficients for interpolating new pixel values, and providing as an output a signal directing the memory controller to direct to a cache memory a set of original image pixels including the pixel at the reference position, and three other pixels whose position is a predetermined function of the position of the reference position pixel;

an interpolation calculator receiving as inputs the pair of interpolation coefficients for interpolating new pixel values from the bilinear sequencer and the set of original image pixels and calculating a new pixel value therefrom; and an interpolated image output, receiving as an input the new pixel, and directing the pixel to an external device.

In accordance with still another aspect of the invention, the arrangement can accommodate independent multi channel hardware arrangements by providing for each independent channel:

page memory means, each operatively connected to the receiving means for storing a page of original image received from one of the first number of channels, a bilinear sequencer, operatively associated with the page memory means and calculating for each new pixel, from a set of provided values a reference pixel within the image, and a pair of interpolation coefficients for interpolating new pixel values, and providing an output indicative thereof to the page memory, means, responsive to the output of the bilinear sequencer, for retrieving to an interpolation calculator from the page memory a set of original image pixels including the pixel at the reference position, and three other pixels whose position is a predetermined function of the position of the reference position pixel for each new pixel, and an interpolation calculator calculating a new pixel value as a function of the set of original pixels directed thereto by the bilinear sequencer;

means for providing a set of values to each bilinear sequencer in each independent channel indicating: a slow scan initial pixel value Xinit, a fast scan initial pixel value Yinit, a fast scan x offset value FSx, a fast scan y offset value FSy, a slow scan x offset value SSx, and a slow scan y offset value SSy, the values common for an entire original image; and means for merging new pixels produced at each independent channel into a single new image.

In accordance with yet another aspect of the invention, the same hardware accommodates rotation and deskew by providing:

means for providing a set of six values indicating: a slow scan initial pixel value Xinit, a fast scan initial pixel value Yinit, a fast scan x offset value FSx, a fast scan y offset value FSy, a slow scan x offset value SSx, and a slow scan y offset value SSy responsive to a skew determination, until the determination is with a predetermined limit;

a bilinear sequencer calculating for each new pixel, from the provided values a reference pixel within the image, and a pair of interpolation coefficients for interpolating new pixel values, and providing an output indicative thereof to the page memory;

means, responsive to the output of the bilinear sequencer, for retrieving to an interpolation calculator from the page memory a set of original image pixels including the pixel at the reference position, and three other pixels whose position is a predetermined function of the position of the reference position pixel for each new pixel;

means for determining skew, the skew determining means providing the skew determination to the providing means; and an interpolation calculator calculating a new pixel value as a function of the set of original pixels directed thereto by the bilinear sequencer.

DESCRIPTION OF THE PREFERRED EMBODIMENT

The following description includes references to slow scan and fast scan digital image data when discussing the orientation of the window coordinates and sampled signals used by the background determination circuitry. For purposes of clarification, data collected along a fast scan direction is intended to refer to individual pixels located in succession along a raster of image information, while data collected in the slow scan direction refers to data derived from a common raster position across multiple rasters or scanlines. As an example, slow scan data would be used to describe signals captured from a plurality of elements along a linear photosensitive array, as the array was moved relative to a document. On the other hand, fast scan data would refer to the sequential signals collected along the length of the linear photosensitive array during a single exposure period, and is also commonly referred to as a raster of data.

The following description also includes references to video image signals, or pixels, which are generally digital voltage representations of the density of the image at a discrete are therein, as provided from a suitable source. For example, the image pixels may be obtained through line by line scanning of an image bearing original by one or more photosensitive elements, such as a multiple photosite array of charge coupled devices, commonly referred to as CCD's. Line by line scanning of an image bearing original for the derivation of image data is well known and does not form a part of the present invention. Furthermore, for the purposes of the following description, it will be assumed that the video signals are digital signals or pixels that fall within a particular domain of values representing a greyscale, where the lower signal levels generally represent regions of an image having content, as opposed to background regions which will generally be reflected by higher signal levels.

In accordance with the invention, interpolation is implemented using the technique of bilinear interpolation between 4 neighboring pixels, where a general equation describing the technique is:

$$P_{new}=P_{n,m}(1-a-b+ab)+P_{n+1,m}(a-ab)+P_{n,m}(b-ab)+P_{n+1,m+1}(ab) \quad (1)$$

where $P_{new}$ is the new pixel whose position and value are to be calculated.

$P_{n,m}$; $P_{n+1,m}$; $P_{n,m}$; $P_{n+1,m+1}$ are original pixels at positions given as a function of m and n; and a and b are scaling or interpolation factors which determine the placement and value of the output pixel.

Figure 1:
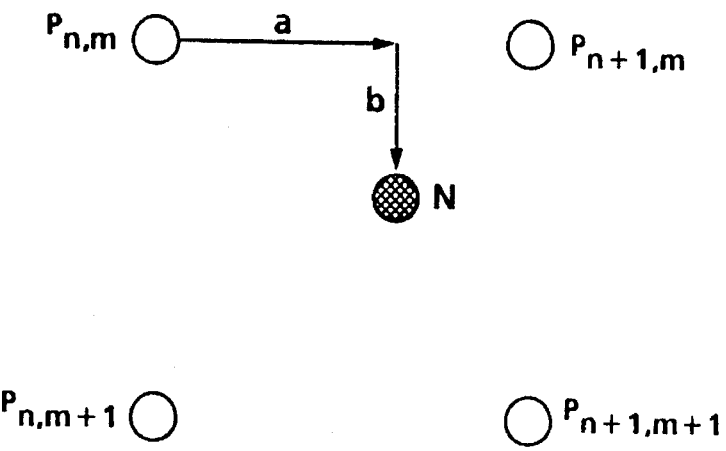
FIG. 1 is a graphical illustration of bilinear interpolation data requirements.

FIG. 1 graphically shows the relationship given in equation (1). The present invention is directed to the challenge of designing an efficient method of calculating the scale factors a and b which vary from pixel to pixel, and to determine which old pixels $P_{n,m}$; $P_{n+1,m}$; $P_{n,m}$; $P_{n+1,m+1}$ should be used to generate $P_{new}$.

Figure 2:
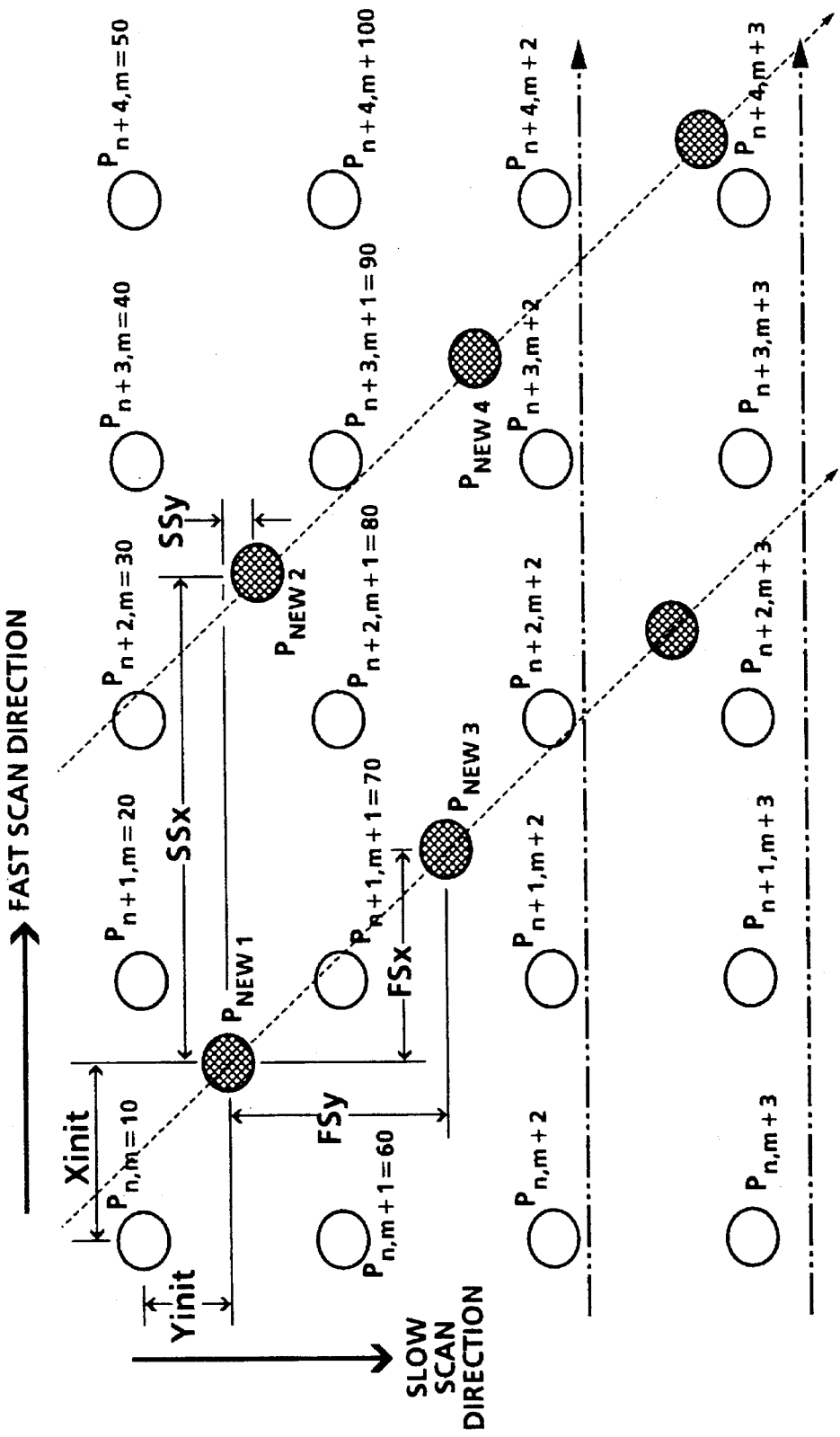
FIG. 2 is a graphical illustration of the required variables in the bilinear interpolation.

With reference now to FIG. 2, six input values are used to calculate a and b for every output pixel $P_{new}$:

Yinit=slow scan initial pixel value;

Xinit=fast scan initial pixel value;

FSx=fast scan x offset value;

FSy=fast scan y offset value;

SSx=slow scan x offset value;

SSy=slow scan y offset value.

Given pixel $P_{n,m}$ at location (0,0), pixels $P_{NEW1}$, $P_{NEW2}$, $P_{NEW3}$, $P_{NEW4}$ represent the spatial locations of the new pixels. In the example of FIG. 2, the new pixels are a result of a rotation process. The inventive bilinear interpolation method can be used as part of the rotation function, the magnification and reduction functions, or in combination, depending on the 6 input values.

Now equations (2) and (3) use these six values to generate a and b from equation 1 for every new pixel a=Fraction of[Xinit+SSx (scanline)+FSx(pixel)] (2)

b=Fraction of[Yinit+SSy(scanline)+FSy(pixel)] (3)

n=Integer[Xinit+SSx(scanline)+FSx(pixel)] (4)

m=Integer of[Yinit+SSy(scanline)+FSy(pixel)] (5)

In these equations, a and b represent fractions of distances to the closest pixels, while n and m, represent the pixel positions in integer numbers.

Accordingly, given the set of example pixel values in FIG. 2 (where 255 is white and 0 is black), and assume that an image processing function returns the values:

Xinit=0.5; FSx=0.9; SSx=1.7

Yinit=0.7 FSy=0.8; SSy=0.4

For the first new pixel ($P_{NEW1}$) in the first scan line (pixel 0,0), the method returns a=Fraction [(0.5)+(0)(1.7)+(0)(0.9)]=0.5 b=Fraction of[(0.7)+(0)(0.4)+(0)0.8]=0.7 n=Integer[(0.5)+(0)(1.7)+(0)(0.9)]=0 m=Integer of[(0.7)+(0)+(0.8)(0)]=0

Using equation 1, we derive $P_{NEW1}$=50

For the new pixel ($P_{NEW4}$) in the second scan line (pixel 1,1), the method returns a=Fraction [(0.5)+(1)(1.7)+(1)(0.9)]=0.1 b=Fraction of [(0.7)+(1)(0.4)+(1)(0.8)]=0.9 n=Integer [(0.5)+(1)(1.7)+(1)(0.9)]=3 m=Integer of [(0.7)+(1)(0.4)+(1)(0.8)]=1

Using equation 1, we derive $P_{NEW4}$=136.

Figure 3:
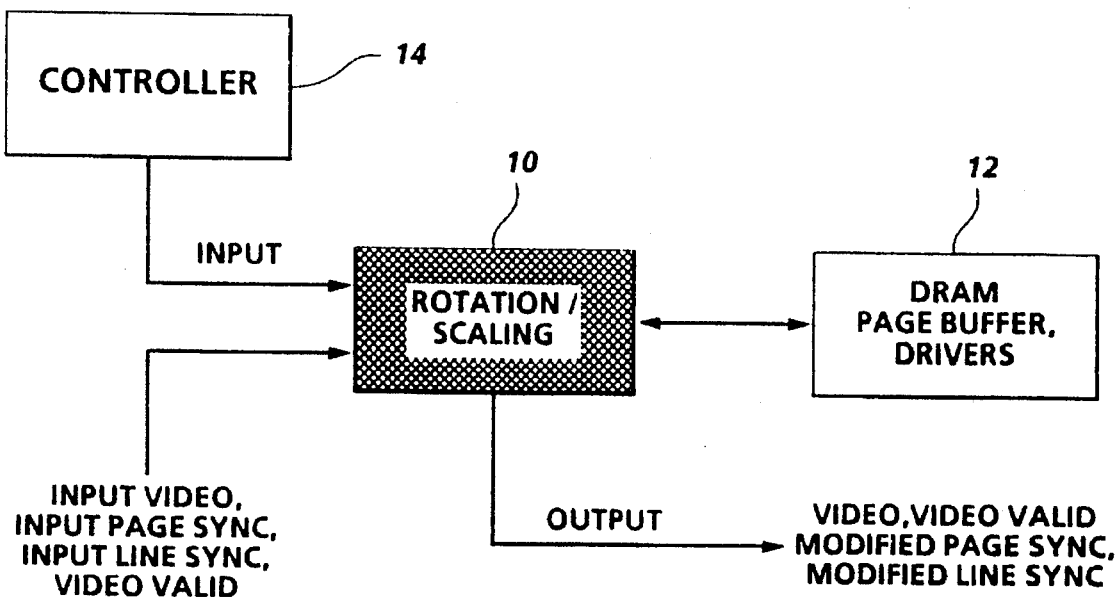
FIG. 3 is a generalized block diagram of the inventive interpolation device in an image processing system.

FIG. 3 illustrates the environment in which the present invention may find use. Input data, including the image data, page synch, line synch and video valid signals are input to the rotation/scaling system 10 to be described. In one possible embodiment, a DRAM page buffer 12 and appropriate drivers may be connected to the rotation/scaling system, with appropriate memory control arrangements. Commands for rotation/scaling are delivered to the system from an external controller 14, or an internal detection system. Rotated and/or scaled data are directed to an output, which in the typical arrangement will be further image processing system elements.

Figure 4:
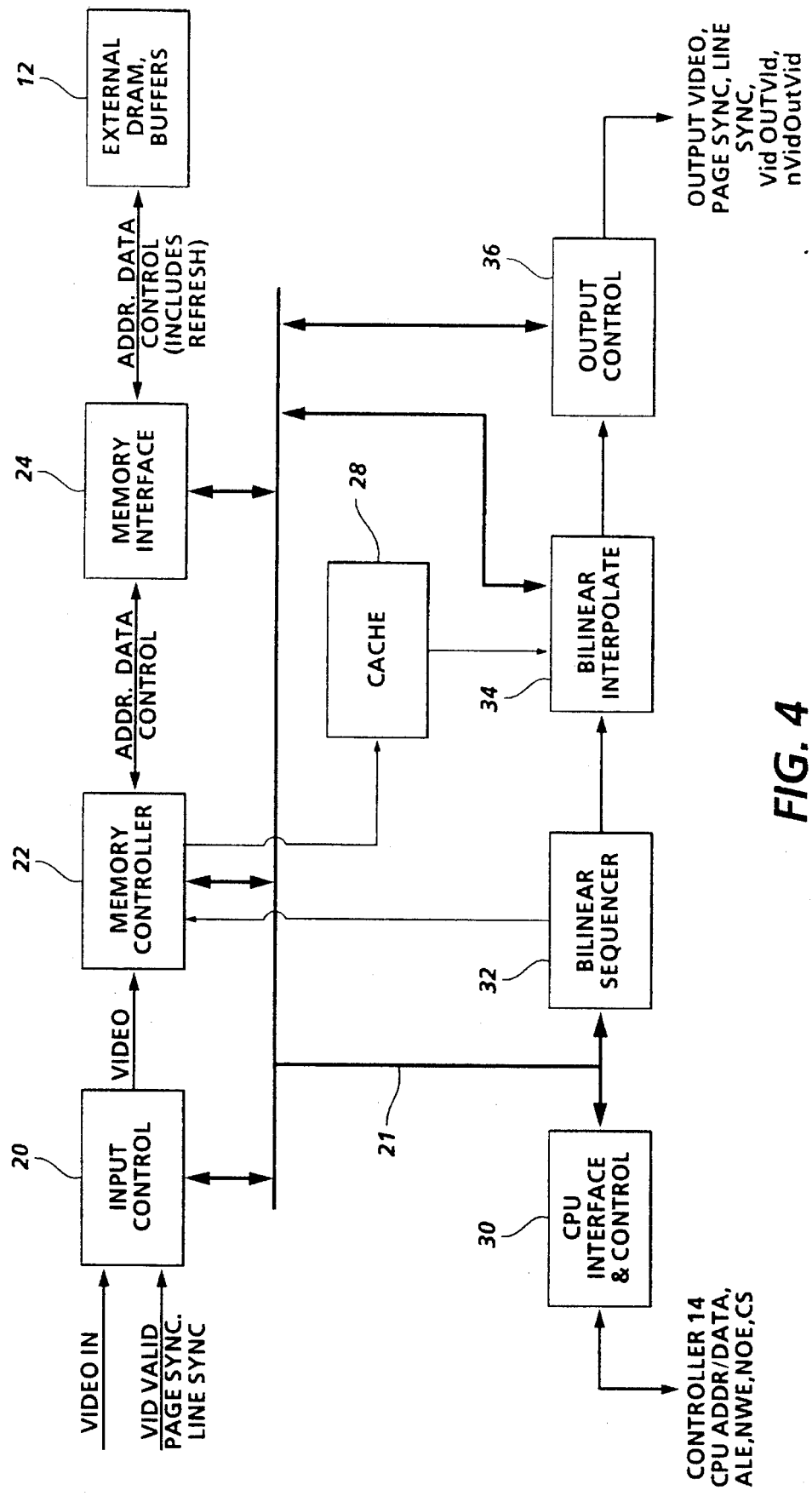
FIG. 4 is a functional block diagram illustrating an embodiment of the present invention.

FIG. 4 illustrates a common use for the bilinear interpolation scheme described, by providing a more detailed view of the FIG. 3 system. Input control 20 receives input data, including image data, page synch, line synch and video valid signals, and directs image data to memory control 22. Control signals to and from input control 20 are received via a CPU bus 21, which carries controls signals within the system among the various system elements. Image data is stored to external page buffer 12 via memory control 22, and memory interface 24. Memory controller 22 and memory interface 24 are each respectively connected to the CPU bus 21 to control reading and writing image data to and from page buffer 12.

Cache 28 is provided as a source of image data connected to the bilinear interpolator 34, as a source of image date, since typical devices used for page buffer memory 12, like DRAM, are too slow for real time operations. Bilinear sequencer 32 keeps track of which image data is required CPU interface and control 30. Accordingly, bilinear sequencer 32 is connected to memory controller 22, to cause appropriate image data to be written from page buffer 12 to cache 28. The output of bilinear interpolator 34 is directed to the output controller 36, which established the correct format of the image day for subsequent output devices.

The operation of the bilinear sequencer is to process through stored image data at any user specified angle and resolution by generating original pixel addresses. The controller provides the bilinear with six input values (XInit, YInit, FSX, FSY, SSX and SSY). With the order of addresses of original data determined, the interpolator can be supplied with data that accomplishes either rotation or scaling.

Figure 5:
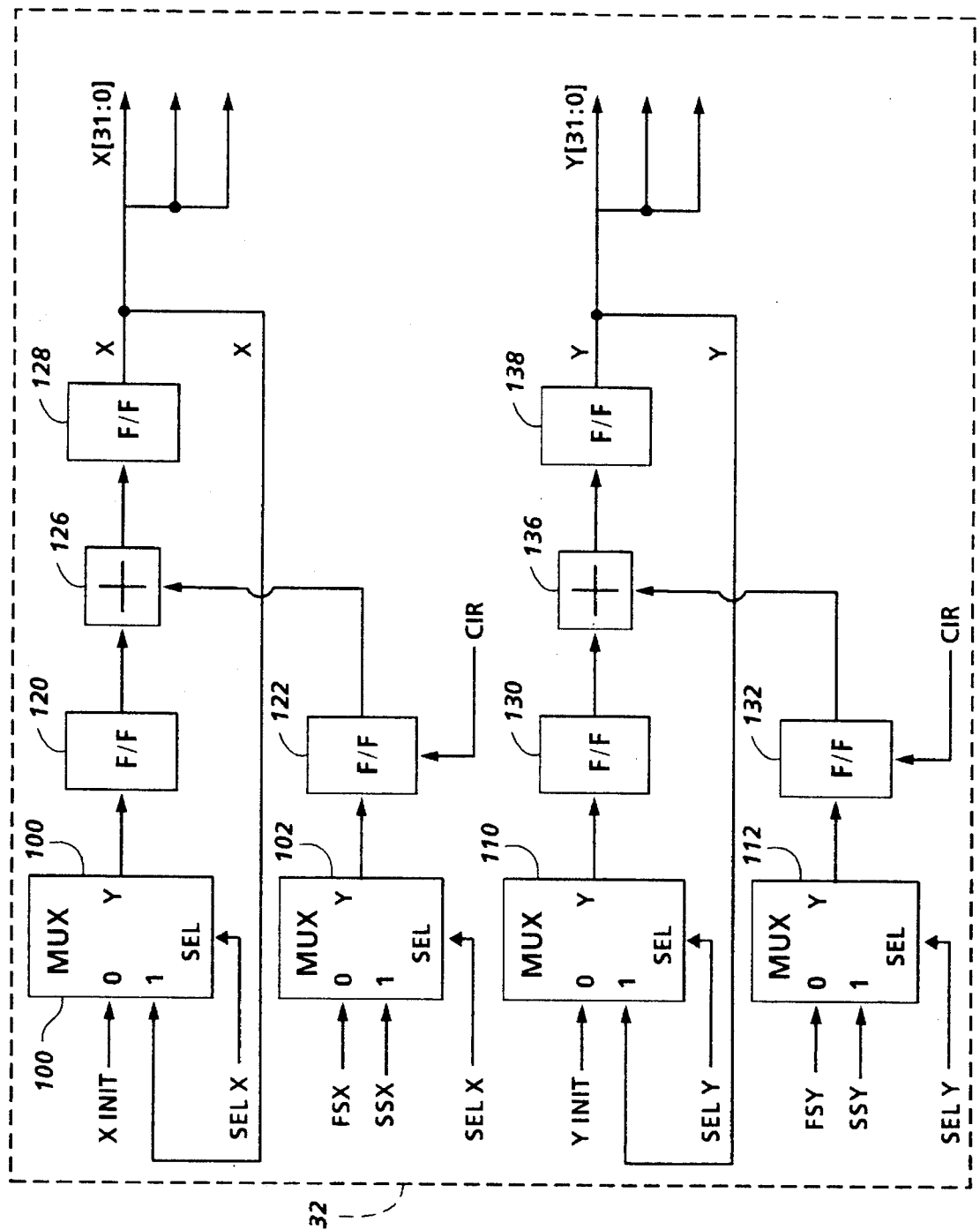
FIG. 5 is a functional block diagram of the bilinear sequencer of FIG. 4.

FIG. 5 shows a possible block diagram of the bilinear sequencer circuit, which, based on the six input values, calculates a, b and m, n. Notice that the inputs include the six starting values (XInit, YInit, FSX, FSY, SSX and SSY). This circuit implements Eqs. 1–4. $P_{new}$ in FIGS. 1 and 2 could also be called $P_{a,b}$. Instead of directly implementing Eqs. 2–5 the logic required was reduced by multiplexing FSX, FSY, SSX and SSY into adders when needed. Avoided is the use of any multipliers, by accumulating a sum over the page.

Multiplexers 100 and 102 have as inputs the data required for interpolation along the slow scan direction from a source such as an image processing controller or the like. Accordingly, input 0 to multiplexer 100 may conveniently be a 32 bit signal representing Xinit, while input 1 to multiplexer 100 is a 16 bit value providing a feedback value representing an integer result of the previous operations. Input 0 to multiplexer 102 may conveniently be a 16 bit signal representing FSx, while input 1 to multiplexer 102 is a 16 bit value representing SSx. Directed to both Multiplexers 100 and 102, SelX controls the multiplexers 100, 102 so that FSx is selected for every new pixel, while SSx is selected only for the start of a new line (see Eq. 2). Input 0 to multiplexer 110 may conveniently be a 32 bit signal representing Yinit, while input 1 to multiplexer 110 is a 16 bit value providing a feedback value representing an integer result of the previous operations. Input 0 to multiplexer 112 may conveniently be a 16 bitsignal representing FSY, while input 1 to multiplexer 112 is a 16 bit value representing SSy. Directed to both Multiplexers 110 and 112, SelY controls the multiplexers 110, 112 so that FSY is selected for every new pixel, while SSy is selected only for the start of a new line (see Eq. 5).

The output of multiplexers 100 and 102 are respectively directed to Flip/Flops (F/F) 120 and 122, which serve as data latches at signal adder 126. The Clr input to F/F 122 resets the device to zero at the start of the page, so that F/F 128 contains only Xinit. Notice that equations 2 and 4 are reduced to Xinit at the start of the page (scanline=0 and pixel=0). At adder 126, the values stored at F/F 120 and 122 are added, and the results are stored to F/F 128 for subsequent output, and a portion of the signal is fed back to input 1 to multiplexer 102. The result is a 32 bit number, called X[31:0]. X31 is the sign bit. X[30:16] is the integer portion n. X[15:0] is the fraction portion a, however, it is truncated to 8 bits and only X[15:8] is used. Likewise, for the fast scan direction the output of multiplexers 110 and 112 are respectively directed to Flip/Flops (F/F) 130 and 132, which serve as data latches at signal adder 136. The Cir input to F/F 132 resets the device to zero at the start of the page, so that F/F 138 contains only Yinit. Notice that the equations 3 and 5 are reduced to just Yinit at the start of the page (scanline=0 and pixel =0). At adders 136, the values stored at F/F 130 and 132 are added, and the results are stored to F/F 138 for subsequent output, and a portion of the signal is fed back to input 1 to multiplexer 112. The result is a 32 bit number, called Y[31:0]. Y31 is the sign bit. Y[30:16] is the integer portion m. Y[15:8] is the fraction portion b, however, it is truncated to 8 bits and only Y[15:8] is used.

A direct implementation of Eqs. 1–4 using 8 multipliers, 8 adders, and some flip flops would take up approximately 14,000 gates. The implementation shown here uses approximately 3,000 gates, using Texas Instruments' TGC1000 5v CMOS gate array library. About a 10 fold savings in gates would be available in most cases.

Bilinear interpolation then becomes a straightforward implementation of equation 1, or a simplified variant, using the pixels determined and the coefficients determined. With reference to FIG. 1, one such variant is the calculation of the new pixel position and values based on 1) linear interpolation between $P_{n,m}$ and $P_{n+1,m}$, 2) linear interpolation between $P_{n,m+1}$ and $P_{n+1,m+1}$, and 3) linear interpolation between the results of 1) and 2), a method that desirably reduces the number of multiplications required in the interpolation equation.

Figure 6:
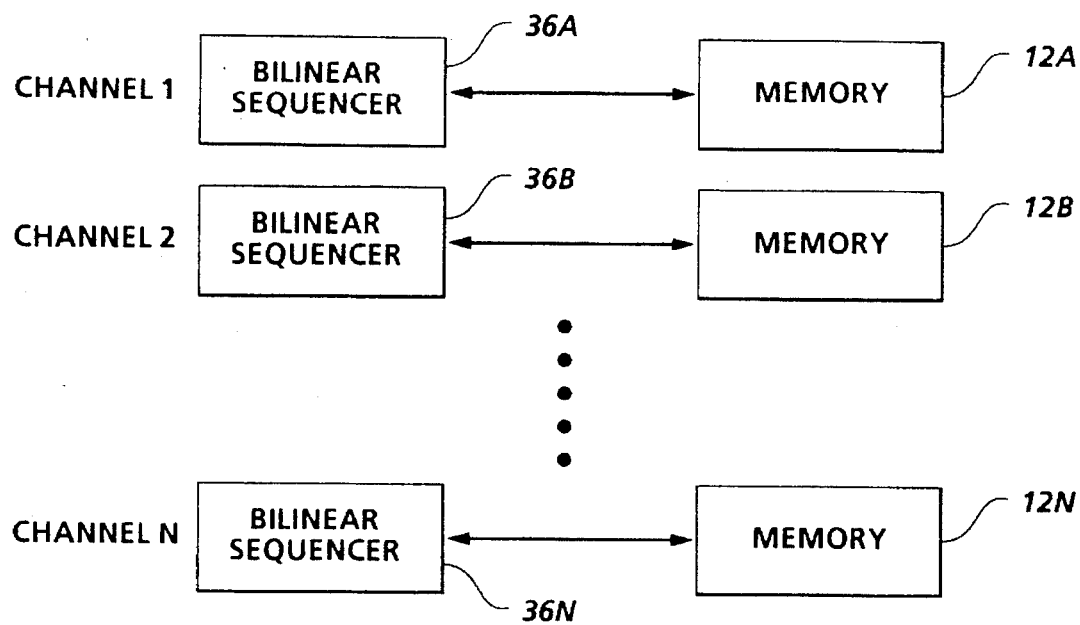
FIG. 6 shows the invention in the context of a multi channel system.
Figure 7:
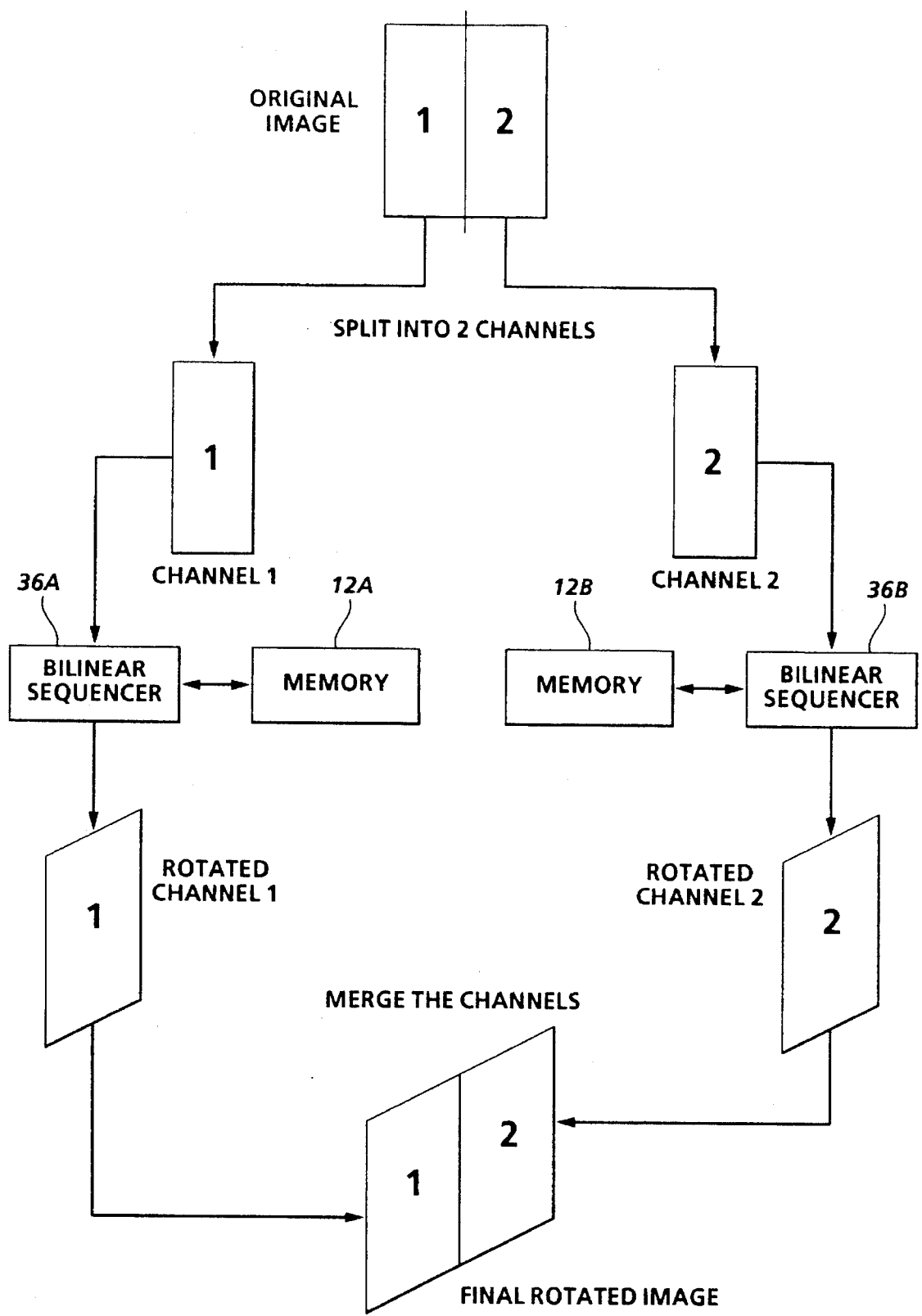
FIG. 7 graphically illustrates the relationship of the present invention to a multi channel system.

Many image processing arrangements work in a multi-channel context that divides a scan line into plural, somewhat independently processed elements. With reference now to FIG. 6, illustrated is a plurality of bilinear sequencers 36a, b, . . . N, each with its own memory 12 a, b, . . . N. The memories may be cache or DRAM, depending on the system's performance requirements. Each element of the image is processed independently, relying on a corresponding bilinear interpolator to call the appropriate pixels from memory for interpolation processing. The rotated segments are then merged together. FIG. 7 graphically illustrates the process.

Rotation and deskew are related operations which are adaptable to using common hardware. The difference between the two operations is mostly by definition: rotation provides rotation of the image in accordance with a user selected angle of rotation, while deskew deals with rotation of the image in accordance to account for unknown rotation. A system for accomplishing both operations with a significant component of common hardware is given as FIG. 8.

Figure 8:
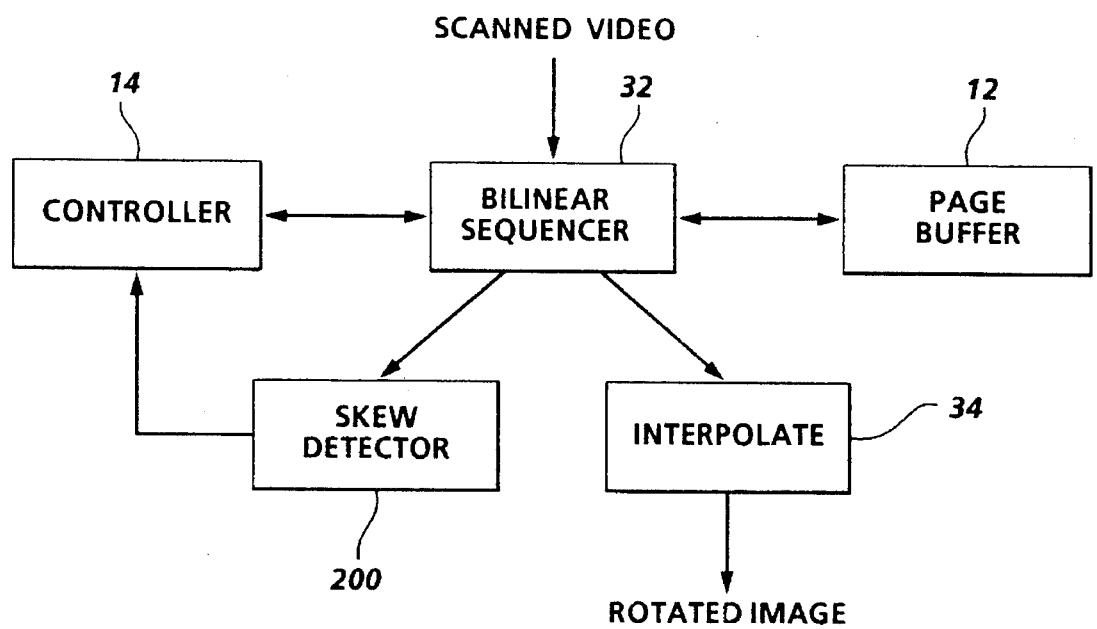
FIG. 8 shows a system block diagram showing the use of the invention in a dual use context for interpolation and iterative deskew removal.

With reference to FIG. 8, scanned image data is directed into the system shown which for illustration purposes will be divided up into the functions of the bilinear sequencer 32, page buffer 12 and bilinear interpolator 34, although a completely described system would include the functions of FIGS. 3 and 4. If rotation has been selected, data is directed through the system elements, as previously described, in accordance with values determined by controller 14, to output rotated data.

As noted, deskew is essentially the same process as image rotation, except that the amount of rotation is initially unknown. Accordingly, the controller 14 of FIG. 8 first calculates variance or skew within the image, using the algorithm:

$$\text{Variance } (\theta) = \Sigma_x (\Sigma_y P(x,y))^2$$

The algorithm describes that, for a given rotation angle θ, all of the black pixels in a skewed line are summed, the result is squared, and the operation repeated for all lines on the page. This will result in a variance number of the angle θ. The operation is repeated for other angles, until the angle for which the variance is the largest is obtained. This will be the angle that the scanned image is skewed to with respect to the original. The method of skew detection is detailed in U.S. Pat. No. 5,187,753 to Bloomberg, incorporated herein by reference.

With reference again to FIG. 8, bilinear sequencer 32 reads image data from the page buffer 12, and directs interpolation data to the skew detector 200, which combines the operations of 1) computing new pixel values in a scan line; 2) summing the pixel values along the scan line; 3) squaring the sum, and 4) summing the squares for the page; and 5) producing the variance value to the controller 14. This process is produced iteratively, until the largest variance value is found. Then, using the appropriate set of interpolation values, the image is rotated.

It is, therefore, apparent that there has been provided in accordance with the present invention, an apparatus employing a novel interpolation method to produce interpolated image data coincident with the processing thereof, thereby fully satisfying the aims and advantages hereinbefore set forth. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method of providing interpolated video image signals from original video image signals representing a document image, each video image signal defined in terms of intensity and position in the original video image, comprising the steps:

receiving an original document image from an original video image signal source;

storing enough of the received video image signals in a page memory to overlap an entire scan line of interpolated video signals;

receiving a set of values indicating an interpolation requirement: a slow scan initial value Xinit, a fast scan initial value Yinit, a fast scan x offset value FSx, a fast scan y offset value FSy, a slow scan x offset value SSx, and a slow scan y offset value SSy;

for each new video image signal generating from said received values a reference video image signal within the document image, and a pair of interpolation coefficients for interpolating new video image signal values;

for the new video image signal, retrieving to an interpolation calculator from the page memory a set of original video image signals including said reference video image signal, and three other video image signals whose position is a predetermined function of the position of said reference video image signals;

generating a new video image signal having an intensity and position as a function of the set of original video image signals, wherein the step of generating for each new video image signal from said determined values a reference pixel within the image, and a pair of interpolation coefficients for interpolating new pixel values is in accordance with the functions:

a=Fraction [Xinit+SSx (scanline)+FSx(pixel)]

b=Fraction of [Yinit+SSy(scanline)+FSy(pixel)]

n=Integer[Xinit+SSx(scanline)+FSx(pixel)]

m=Integer of[Yinit+SSy(scanline)+FSy(pixel)]

where a is a fast scan coefficient of video image signal b is a slow scan coefficient of video image signal n is the position of the video image signals in the fast scan direction; and m is the position of the video image signal in the slow scan direction;

pixel is the position of the new video image signal in a scan line of the new document image; and scanline is the position of the new scan line in the new document image.

2. The method as described in claim 1, wherein the original document image source is a scanner deriving said video image signals as a function of sensed reflected light from an illuminated document.

3. The method as described in claim 1, wherein the page memory is a DRAM.

4. The method as described in claim 1, wherein the interpolation requirement is a rotation of the original image.

5. The method as described in claim 1, wherein the interpolation requirement is a scaling of the original image.

6. The method as described in claim 1, wherein the interpolation calculator generates the new video image signal intensity in accordance with the function:

$$P_{new}=P_{n,m}(1-a-b+ab)+P_{n+1,m}(a-ab)+P_{n,m+1}(b-ab)+P_{n+1,m+1}(ab)$$

where

P refers to the video image signal intensity at a subscripted location.

7. Apparatus for providing interpolated video image signals from original video image signals representing an original document image, each video image signal defined in terms of intensity and position in the original document image, comprising:

means for receiving an original document image from an original video image signal source;

page memory means, operatively connected to said receiving means for storing a sufficient number of scan lines of video image signals representing a page of original image received therefrom, said number large enough to overlap an entire scan line of interpolated video signals;

means receiving from an external source a set of six values indicating: a slow scan initial value Xinit, a fast scan initial value Yinit, a fast scan x offset value FSx, a fast scan y offset value FSy, a slow scan x offset value SSx, and a slow scan y offset value SSy;, a bilinear sequencer calculating for each new video image signal, from said received values a reference video image signal within the document image, and a pair of interpolation coefficients for interpolating new video image signals, and providing an output indicative thereof to said page memory;

wherein the bilinear sequencer calculates from said received values a reference video image signals within the image, and a pair of interpolation coefficients for interpolating new video image signals values in accordance with the functions:

a=Fraction of [Xinit+SSx (scanline)+FSx(pixel)]

b=Fraction of [Yinit+SSy(scanline)+FSy(pixel)]

n=Integer [Xinit+SSx(scanline)+FSx(pixel)]

m=Integer of [Yinit+SSy(scanline)+FSy(pixel)]

where a is a fast scan coefficient of a video image signal value b is a slow scan coefficient of the video image signal value n is the position of the reference video image signal in the fast scan direction; and m is the position of the reference video image signal in the slow scan direction;

pixel is the position of the new video image signal in a scan line of the new image; and scanline is the position of the new scan line in the image;

means, responsive to the output of said bilinear sequencer, for retrieving to an interpolation calculator from the page memory a set of original video image signals including said reference video image signal, and three other video image signals whose position is a predetermined function of the position of said reference video image signal for each new video image signal; and an interpolation calculator generating a new video image signal as a function of the set of original video image signals directed thereto by the bilinear sequencer.

8. The apparatus as described in claim 7, wherein the original document image source is a scanner deriving said video image signals as a function of sensed reflected light from an illuminated document.

9. The apparatus as described in claim 7, wherein the page memory is a DRAM.

10. The apparatus as described in claim 7, wherein the interpolation requirement is a rotation of the original image.

11. The apparatus as described in claim 7, wherein the interpolation requirement is a scaling of the original document image.

12. The apparatus as described in claim 7, wherein the interpolation calculator calculates the new video image signal value in accordance with the function:

$$P_{new}=P_{n,m}(1-a-b+ab)+P_{n+1,m}(a-ab)+P_{n,m}+(b-ab)+P_{n+1,m+1}(ab)$$

where

P refers to the video image signal value at a subscripted location.

* * * * *